United States Patent
Inoue et al.

(10) Patent No.: US 9,972,411 B2
(45) Date of Patent: May 15, 2018

(54) COPPER ALLOY WIRE, COPPER ALLOY STRANDED WIRE, COVERED ELECTRIC WIRE, AND TERMINAL-FITTED ELECTRIC WIRE

(71) Applicants: Sumitomo Electric Industries, Ltd., Osaka-shi (JP); AutoNetworks Technologies, Ltd., Yokkaichi (JP); Sumitomo Wiring Systems, Ltd., Yokkaichi (JP)

(72) Inventors: Akiko Inoue, Osaka (JP); Taichiro Nishikawa, Osaka (JP); Tetsuya Kuwabara, Osaka (JP); Misato Kusakari, Osaka (JP); Hiroyuki Kobayashi, Yokkaichi (JP)

(73) Assignees: Sumitomo Electric Industries, Ltd., Osaka-shi (JP); AutoNetworks Technologies, Ltd., Yokkaichi, Mie (JP); Sumitomo Wiring Systems, Ltd., Yokkaichi, Mie (JP)

( * ) Notice: Subject to any disclaimer, the term of this patent is extended or adjusted under 35 U.S.C. 154(b) by 0 days. days.

(21) Appl. No.: 14/767,875

(22) PCT Filed: Oct. 16, 2013

(86) PCT No.: PCT/JP2013/078035
§ 371 (c)(1),
(2) Date: Aug. 13, 2015

(87) PCT Pub. No.: WO2014/125677
PCT Pub. Date: Aug. 21, 2014

(65) Prior Publication Data
US 2015/0371726 A1    Dec. 24, 2015

(30) Foreign Application Priority Data
Feb. 14, 2013 (JP) ................ 2013-026516

(51) Int. Cl.
| *H01B 1/02* | (2006.01) |
| *C22C 9/00* | (2006.01) |
| *C22C 9/01* | (2006.01) |
| *C22C 9/02* | (2006.01) |
| *C22C 9/04* | (2006.01) |
| *C22C 9/06* | (2006.01) |
| *C22F 1/08* | (2006.01) |
| *H01B 3/44* | (2006.01) |
| *H01B 7/295* | (2006.01) |
| *H02G 15/02* | (2006.01) |
| *C22F 1/00* | (2006.01) |

(52) U.S. Cl.
CPC ............. *H01B 1/026* (2013.01); *C22C 9/00* (2013.01); *C22C 9/01* (2013.01); *C22C 9/02* (2013.01); *C22C 9/04* (2013.01); *C22C 9/06* (2013.01); *C22F 1/08* (2013.01); *H01B 3/44* (2013.01); *H01B 7/295* (2013.01); *H02G 15/02* (2013.01); *C22F 1/00* (2013.01)

(58) Field of Classification Search
CPC ............. H01B 5/08; H01B 1/026; H01R 4/20
USPC .................................. 174/84 C, 126.1, 128.1
See application file for complete search history.

(56) References Cited

U.S. PATENT DOCUMENTS

| 4,559,200 A | 12/1985 | Yamasaki et al. |
| 5,149,917 A * | 9/1992 | Sawada ............... B60R 16/0215 |
| | | 174/110 R |
| 5,486,653 A * | 1/1996 | Dohi .................... H01R 43/058 |
| | | 174/84 C |
| 2004/0238086 A1 | 12/2004 | Saleh |
| 2010/0096185 A1* | 4/2010 | Otsuka ................... H01R 4/021 |
| | | 174/94 R |

FOREIGN PATENT DOCUMENTS

| CN | 1574107 A | 2/2005 |
| JP | 60-039139 A | 2/1985 |
| JP | H03-271340 A | 12/1991 |
| JP | 04-268035 A | 9/1992 |
| JP | 06-080263 U | 11/1994 |
| JP | 2008-016284 A | 1/2008 |
| JP | 2009-167450 A | 7/2009 |
| JP | 2010-198872 A | 9/2010 |

OTHER PUBLICATIONS

Notification of the First Office Action in Chinese Patent Application No. 2013800728347, dated Apr. 1, 2016.
International Search Report in PCT Application No. PCT/JP2013/078035 dated Dec. 17, 2013.
International Preliminary Report on Patentability in PCT Application No. PCT/JP2013/078035 dated Jul. 3, 2014.
Fu, et al., "Study of Electrical Instrument Materials" National Defense Industry Press, Jun. 30, 2004, pp. 124-127 [Cited in OA from counterpart CN Application No. 201380072834.7 dated Aug. 3, 2017].

* cited by examiner

*Primary Examiner* — Chau N Nguyen
(74) *Attorney, Agent, or Firm* — Venable LLP; Michael A. Satori; Laura G. Remus

(57) ABSTRACT

An object of the present invention is to provide an ultrafine copper alloy being high in strength and conductivity and being also superior in elongation, a copper alloy stranded wire, a covered electric wire including the copper alloy wire or copper alloy stranded wire, and a terminal-fitted electric wire. A copper alloy wire used as a conductor, the copper alloy wire containing greater than or equal to 0.4% by mass and less than or equal to 1.5% by mass of Fe, greater than or equal to 0.1% by mass and less than or equal to 1.0% by mass of Ti, and the remainder including Cu and an impurity.

1 Claim, No Drawings

COPPER ALLOY WIRE, COPPER ALLOY STRANDED WIRE, COVERED ELECTRIC WIRE, AND TERMINAL-FITTED ELECTRIC WIRE

TECHNICAL FIELD

The present invention relates to a copper alloy wire and a copper alloy stranded wire both used for a conductor of an electric wire routed in an automobile, etc., a covered electric wire including the copper alloy wire or the copper alloy stranded wire as a conductor, and a terminal-fitted electric wire including the covered electric wire. Particularly, the present invention relates to a copper alloy wire being ultrafine, having high strength and high conductivity, and being superior in elongation.

BACKGROUND ART

Conventionally, constituent materials of electric wire conductors used for routing in automobiles and the like are dominated by copper-based materials superior in conductivity, such as copper and copper alloys. Considerable work has been done to improve mechanical properties such as tensile strength (see, for example, Japanese Laid-Open Patent Publication No. 2008-016284 (Patent Document 1)).

Japanese Laid-Open Patent Publication No. 2008-016284 (Patent Document 1) discloses an electric wire conductor for automobiles produced by stranding more than one hard wires with their mechanical properties, such as tensile strength, longitudinal modulus of elasticity, and conductivity, having been improved by applying wiredrawing at a degree of cold working greater than or equal to 99% to a copper alloy containing any one selected from Mg, Ag, Sn, and Zn in a specific range of content.

CITATION LIST

Patent Document

PTD 1: Japanese Laid-Open Patent Publication No. 2008-016284

SUMMARY OF INVENTION

Technical Problem

With the recent rapid enhancement in performance and capabilities of automobiles, and a consequent increase of various on-board electrical devices, control devices and the like, the number of electric wires used for these devices also tends to increase. Meanwhile, in recent years, weight reduction is strongly desired in order to enhance the fuel efficiency of a transportation device such as an automobile, for the purpose of environmental protection.

In order to achieve weight reduction in an electric wire, an ultrafine electric wire having a wire diameter less than 0.3 mm is desired, for example. An ultrafine electric wire tends to be broken by impact applied at the time of routing. Therefore, such a wire is required to have superior impact resistance and flexural characteristics, and it is desired to develop a copper alloy wire having sufficient elongation. While the electric wire conductor disclosed in Japanese Laid-Open Patent Publication No. 2008-016284 (Patent Document 1) is superior in tensile strength, there is room for improvement in elongation.

The present invention has been devised in light of the above-mentioned circumstances, and one object thereof is to provide a copper alloy wire being ultrafine, having high strength and high conductivity, and being also superior in elongation. Another object of the present invention is to provide a copper alloy stranded wire obtained by stranding more than one copper alloy wires described above. Still another object of the present invention is to provide a covered electric wire including the above-mentioned copper alloy wire or copper alloy stranded wire as a conductor, and a terminal-fitted electric wire including the covered electric wire.

Solution to Problem

The present inventors obtained a finding that a copper alloy wire having high strength and high conductivity and being superior in elongation can be obtained by forming a copper alloy having a specific composition and applying a specific heat treatment to the alloy after wiredrawing. The present invention is based on this finding.

The copper alloy wire of the present invention is a copper alloy wire used as a conductor, and contains Fe in an amount greater than or equal to 0.4% by mass and less than or equal to 1.5% by mass, Ti in an amount greater than or equal to 0.1% by mass and less than or equal to 1.0% by mass, and the remainder including Cu and impurities.

The above-mentioned copper alloy wire of the present invention is high in strength because it is made of a Cu—Fe—Ti-based alloy, and the wire is high in conductivity because additive elements are contained within a specific range of content. While the copper alloy wire of the present invention is subjected to a specific heat treatment after wiredrawing in order to enhance elongation, it can maintain high strength even after being kept at a high temperature for a long time because the copper alloy has a specific composition.

In one embodiment, the copper alloy wire of the present invention further contains one or more additive elements selected from Mg, Sn, Ag, In, Sr, Zn, Ni, Al, and P in an amount greater than or equal to 0.01% by mass and less than or equal to 0.5% by mass in total.

When the copper alloy wire contains one or more of the above-mentioned additive elements, tensile strength can be increased. Especially, Mg and Sn induce little decrease in conductivity, and are highly effective in increasing tensile strength.

In one embodiment of the copper alloy wire of the present invention, Fe/Ti (mass ratio) is greater than or equal to 0.5 and less than or equal to 5.5.

The tensile strength and conductivity of a copper alloy wire are basically determined by precipitation of a compound of Fe and Ti. Therefore, the mass ratio of Fe to Ti is important, and improvement in tensile strength and conductivity can be attained by using the above-mentioned mass ratio.

In one embodiment of the copper alloy wire of the present invention, the elongation is greater than or equal to 5%.

Since the elongation is greater than or equal to 5%, the copper alloy wire can be used suitably for a conductor material of an electric wire that is required to have impact resistance or flexural characteristics. Since the elongation is 5%, the copper alloy wire is hardly broken when routing an electric wire.

In one embodiment of the copper alloy wire of the present invention, the conductivity is greater than or equal to 60% IACS and the tensile strength is greater than or equal to 450 MPa.

Since the conductivity is greater than or equal to 60% IACS and the tensile strength is greater than or equal to 450 MPa, the copper alloy wire can be used suitably for a conductor material of an electric wire that is required to have impact resistance or flexural characteristics. Since the tensile strength is greater than or equal to 450 MPa, breakage hardly occurs, and when terminal crimping is done, the crimped state can be maintained for a long term.

In one embodiment of the copper alloy wire of the present invention, the wire diameter is less than 0.3 mm.

Since the wire diameter of the copper alloy wire is less than 0.3 mm and the wire is ultrafine, the weight reduction of the copper alloy wire can be attained.

While the copper alloy wire of the present invention can be used as a single wire, it can be used as an element wire of stranded wires. For example, the copper alloy stranded wire of the present invention includes an aspect in which more than one copper alloy wires of the present invention are stranded.

The copper alloy stranded wire of the present invention substantially maintains the properties of the copper alloy wire of the present invention constituting the element wires thereof, so that the copper alloy stranded wire has high strength and high conductivity and is also superior in elongation. Since the copper alloy wire of the present invention is superior in elongation, it is hardly broken when copper alloy wires are stranded. In addition, by stranding more than one copper alloy wires of the present invention, mechanical characteristics, such as impact resistance and flexural characteristics, of the stranded wire as a whole can be enhanced compared to the case of a single wire.

In one aspect of the copper alloy stranded wire of the present invention, the copper alloy stranded wire is compressed.

Since the stranded wire is entirely compressed, the stability of the shape of the stranded wire can be increased. In addition, the void ratio to the cross-sectional area of the stranded wire can be reduced.

In one aspect of the copper alloy stranded wire of the present invention, the cross-sectional area of the copper alloy stranded wire is greater than or equal to 0.03 mm$^2$ and less than or equal to 0.5 mm$^2$.

Since the cross-sectional area of the stranded wire is greater than or equal to 0.03 mm$^2$, terminal crimping is certainly attained. Meanwhile, since the cross-sectional area of the stranded wire is less than or equal to 0.5 mm$^2$, weight reduction of the stranded wire can be attained.

The copper alloy wire of the present invention and the copper alloy stranded wire of the present invention can be used suitably for a conductor of an electric wire. In one exemplary aspect, the covered electric wire of the present invention has an insulation covering layer outside a conductor, and the conductor is the copper alloy wire of the present invention or the copper alloy stranded wire of the present invention.

Since the covered electric wire of the present invention includes, as its conductor, the copper alloy wire or copper alloy stranded wire of the present invention being high in strength and conductivity and being also superior in elongation as described above, the covered electric wire is high in strength and conductivity, superior in elongation, and has superior impact resistance and superior flexural characteristics.

The covered electric wire of the present invention can be used suitably for a terminal-fitted electric wire. In one exemplary aspect, the terminal-fitted electric wire of the present invention includes the above-mentioned covered electric wire of the present invention and a terminal section attached to an end portion of the covered electric wire.

Since the terminal-fitted electric wire of the present invention includes the covered electric wire of the present invention being high in strength and conductivity and being also superior in elongation as described above, the terminal-fitted electric wire is high in strength and conductivity, superior in elongation, and has superior impact resistance and superior flexural characteristics.

Advantageous Effects of Invention

The copper alloy wire, copper alloy stranded wire, covered electric wire, and terminal-fitted electric wire of the present invention are each high in strength and conductivity and also superior in elongation.

DESCRIPTION OF EMBODIMENTS

Hereinafter, the present invention will be described in more detail. The content of an element is expressed in % by mass.

[Copper Alloy Wire]

<<Composition>>

The copper alloy that constitutes the copper alloy wire of the present invention contains pure Cu as a main component (base material) and also contains 0.4% to 1.5% of Fe and 0.1% to 1.0% of Ti.

Since the content of Fe is greater than or equal to 0.4%, a copper alloy wire superior in strength is obtained. As the content of Fe increases, the strength of the copper alloy wire increases, but the conductivity decreases or the wire breaks more easily during wiredrawing or the like. Therefore, the content of Fe is limited to less than or equal to 1.5%. The content of Fe is preferably greater than or equal to 0.45% and less than or equal to 1.3%, more preferably greater than or equal to 0.5% and less than or equal to 1.1%.

By making Ti coexist with Fe, the conductivity and the strength are increased. Since the content of Ti is greater than or equal to 0.1%, a copper alloy wire superior in strength is obtained. As the content of Ti increases, the strength of the copper alloy wire increases, but the conductivity decreases or the wire breaks more easily during wiredrawing. Therefore, the content of Ti is limited to less than or equal to 1.0%. The content of Ti is preferably greater than or equal to 0.1% and less than or equal to 0.7%, more preferably greater than or equal to 0.1% and less than or equal to 0.5%.

Since Fe and Ti are made to precipitate and exist in the form of a compound in Cu, the copper alloy wire of the present invention is superior in strength and conductivity. By limiting the mass ratio of Fe to Ti (Fe/Ti) to greater than or equal to 0.5, a compound of Fe and Ti can be made to precipitate moderately and conductivity is increased. Since the conductivity decreases if Fe is superfluous, Fe/Ti is limited to less than or equal to 5.5. Fe/Ti is preferably greater than or equal to 0.7 and less than or equal to 5.3, more preferably greater than or equal to 0.9 and less than or equal to 5.1.

When the copper alloy wire contains one or more additive elements selected from Mg, Sn, Ag, In, Sr, Zn, Ni, Al, and P in addition to Fe and Ti, strength can be enhanced. Mg and Sn induce less decrease in conductivity and can enhance strength. The other elements induce significant decrease in conductivity but are highly effective in enhancing strength. These additive elements may be contained singly or in combination, and the total content thereof is preferably greater than or equal to 0.01% and less than or equal to 0.5%. If the total content of these elements exceeds 0.5%, the strength of the copper alloy wire increases, but the conductivity decreases or the wire breaks more easily during wiredrawing or the like. If the total content of these elements is less than 0.01%, an effect of increasing strength induced by the addition of the elements cannot be obtained sufficiently.

As to a preferable content of each element, that of Mg is preferably greater than or equal to 0.01% and less than or equal to 0.3%, more preferably greater than or equal to 0.01% and less than or equal to 0.15%. In addition, there can be mentioned Sn: more than or equal to 0.02% and less than or equal to 0.3%, Ag: more than or equal to 0.002% and less than or equal to 0.15%, In: more than or equal to 0.01% and less than or equal to 0.15%, Sr: more than or equal to 0.005% and less than or equal to 0.08%, Zn: more than or equal to 0.005% and less than or equal to 0.15%, Ni: more than or equal to 0.005% and less than or equal to 0.15%, Al: more than or equal to 0.005% and less than or equal to 0.15%, and P: more than or equal to 0.002% and less than or equal to 0.008%. For example, when the copper alloy wire contains Sn and Ag in combination, their total content may be greater than or equal to 0.025% and less than or equal to 0.3%.

<<Mechanical Properties>>

The copper alloy wire of the present invention has a high strength and a high conductivity, and preferably satisfies a tensile strength greater than or equal to 450 MPa and a conductivity greater than or equal to 60% IACS. The tensile strength and the conductivity can be varied by the types and contents of the additive elements and production conditions (degree of wiredrawing, temperature in a heat treatment, etc.). For example, when additive elements are added in a greater amount or the degree of wiredrawing is increased (the wire diameter is reduced), the tensile strength tends to become greater and the conductivity tends to become smaller. Although a greater tensile strength and a greater conductivity are preferred, taking into consideration the balance between elongation and strength, the upper limit of the tensile strength is about 650 MPa, and taking into consideration the increment limit of the conductivity due to the precipitation of additive elements, the upper limit of the conductivity is about 80% IACS.

The copper alloy wire of the present invention is superior also in elongation and preferably satisfies an elongation greater than or equal to 5%. The elongation can be changed by performing a specific heat treatment after wiredrawing. For example, the elongation tends to become higher by performing annealing as a heat treatment and making the annealing temperature higher or making the annealing time longer. Specific annealing conditions will be described later. Although a higher elongation is preferred because it affords superior impact resistance or superior flexural characteristics, taking into consideration the balance between elongation and strength, the upper limit of the elongation is about 20%.

<<Wire Diameter>>

By appropriately adjusting the degree of wiredrawing (reduction ratio of cross-sectional area), it is possible to vary the wire diameter of the copper alloy wire of the present invention. For example, when used for an electric wire conductor for an automobile, the wire may be an ultrafine wire having a wire diameter less than 0.3 mm. The copper alloy wire of the present invention is superior in the above-mentioned tensile strength, conductivity, and elongation even if it is an ultrafine wire having a wire diameter less than 0.3 mm.

<<Cross-Sectional Shape>>

The copper alloy wire according to the present invention may have any transverse cross-sectional shape depending on the die shape at the time of wiredrawing. A round wire circular in transverse cross section is representative. In addition, the transverse cross-sectional shape may be any of various shapes such as an elliptical shape and a polygonal shape including a rectangular shape and a hexagonal shape. In the case of an irregular shape such as the elliptical shape or the polygonal shape, the wire diameter is defined as the maximum length across the transverse cross section (the major axis in the case of an ellipse, the diagonal in the case of a rectangle or a hexagon).

[Copper Alloy Stranded Wire]

Stranding more than one copper alloy wires of the present invention into a stranded wire (copper alloy stranded wire of the present invention) affords a conductor being further superior in impact resistance and flexural characteristics. The number of stranded wires is not particularly limited. By compressing the copper alloy stranded wire to form a compressed wire, the stability of a stranded shape is increased. In addition, the void ratio to the cross-sectional area of the stranded wire can be reduced and the wire diameter can be made smaller than that as stranded, and thereby, weight reduction of a stranded wire can be attained. Preferably, the cross-sectional area of the stranded wire is not less than 0.03 $mm^2$ and not more than 0.5 $mm^2$.

[Covered Electric Wire]

The copper alloy wire of the present invention and the copper alloy stranded wire of the present invention can be used for a conductor of an electric wire. They can also be used in the form of a covered electric wire having an insulation covering layer outside a conductor. Examples of the insulating material constituting the insulation covering layer include polyvinyl chloride (PVC), non-halogen resin, and materials superior in flame retardancy. The thickness of the insulation covering layer can be selected appropriately according to desired insulation strength, and it is not limited in particular.

[Terminal-Fitted Electric Wire]

The above-mentioned covered electric wire of the present invention can be used suitably for a terminal-fitted electric wire. Typically, the terminal-fitted electric wire of the present invention is provided with electric wire(s) including one or more covered electric wires of the present invention, and a terminal section is attached to an end portion of each electric wire. Each of the above-mentioned electric wires is connected to a subject such as an electric device through the terminal section. In addition to the aspect of the terminal-fitted electric wire of the present invention in which one terminal section is connected respectively to each of the electric wires, another aspect in which more than one electric wires are connected collectively to one terminal section as a group of electric wires is also available. Examples of the shape of the terminal section include a male shape and a female shape, and examples of the type of connection of the terminal section to the conductor of the covered electric wire include, but are not limited to, a crimp type to crimp a conductor and a melt type to connect a molten conductor. Bundling the plurality of electric wires included in the terminal-fitted electric wire together by using a bundling member or the like provides superior handling ability.

[Production Method]

Typically, the copper alloy wire of the present invention can be produced by the following production method. This production method is a method for producing a copper alloy wire to be used as a conductor, and includes the following continuous casting step, solution step, wiredrawing step, and heat treatment step.

Continuous casting step: a step of preparing a cast material by continuously casting a molten copper alloy having the above-mentioned specific composition.

Solution step: a step of preparing a solid solution wire material by subjecting the cast material to a solution treatment.

Wiredrawing step: a step of preparing a wiredrawn material by subjecting the above-mentioned solid solution wire material to a wiredrawing treatment.

Heat treatment step: a step of subjecting the wiredrawn material to a specific heat treatment described later.

<<Continuous Casting Step>>

First, a cast material consisting of a copper alloy having the above-mentioned specific composition is prepared. For the preparation of the cast material, continuous casting can be suitably used. To perform rapid cooling in this continuous casting step may be one aspect for forming, as a cast material, a solid solution base material in a supersaturated solid solution state where additive elements are fully dissolved in Cu. Although the cooling speed during the casting may be selected appropriately, it is preferably greater than or equal to 5° C./sec. For example, the rapid cooling at the above-mentioned cooling speed can be done easily by using a continuous casting apparatus equipped with a water-cooled copper mold, a forcible water cooling mechanism, and so on. The continuous casting may be performed in any aspect using a movable mold of a belt-and-wheel type or the like or using a stationary frame mold.

Following the casting, the cast material obtained from the above-mentioned continuous casting is subjected to plastic processing, such as swaging and rolling. In this plastic processing, it is preferred to adjust the processing temperature to lower than or equal to 150° C. and the degree of processing to greater than or equal to 50% and less than or equal to 90%.

<<Solution Step>>

One aspect for forming the above-mentioned solid solution base material may be preparation of a solid solution wire material by applying a solution treatment to a cast material obtained from the above-mentioned continuous casting step (this may be either one rapidly cooled as described above or one without having been rapidly cooled) or a plastically processed wire material. In this solution treatment, it is preferred to adjust the heating temperature to higher than or equal to 850° C. and lower than or equal to 950° C., the retention time to longer than or equal to 5 minutes and shorter than or equal to 3 hours, and the cooling speed to greater than or equal to 10° C./sec.

<<Wiredrawing Step>>

The solid solution base material rapidly cooled in the above-mentioned continuous casting step or the solid solution wire material having been subjected to a solution treatment is subjected to wiredrawing, thereby preparing a wiredrawn material having a final wire diameter. The wiredrawing (typically, cold working) is performed over a plurality of passes until the final wire diameter is attained. Preferably, the degree of processing in each pass is appropriately adjusted taking into consideration the composition, the final wire diameter, and so on.

<<Heat Treatment Step>>

The wiredrawn material having been wiredrawn to the final wire diameter is subjected to a specific heat treatment, and thereby a compound of Fe and Ti is precipitated from a supersaturated solid solution state. In the heat treatment, a precipitate can be fully formed by adjusting the heat treatment temperature to higher than or equal to 350° C. and lower than or equal to 550° C. and the retention time to longer than or equal to 30 minutes. The heat treatment temperature may be selected depending on desired characteristics. More preferably, the heat treatment temperature is higher than or equal to 400° C. and lower than or equal to 500° C. and the retention time is longer than or equal to 30 minutes and shorter than or equal to 40 hours. The longer the retention time in the heat treatment is, a larger amount of the precipitate may be formed. Therefore, a longer retention time may help to improve the conductivity. It is preferable to perform the heat treatment after performing wiredrawing because if it is performed before wiredrawing, there is a possibility that a precipitate formed by the heat treatment may serve as a starting point of breakage of a wire material at the time of wiredrawing. By applying the heat treatment to the wiredrawn material and thereby removing strain caused by the wiredrawing, the elongation can be enhanced.

The above-mentioned heat treatment step can afford a copper alloy wire of the present invention that has the above-mentioned specific composition and has a conductivity greater than or equal to 60% IACS, a tensile strength greater than or equal to 450 MPa, and an elongation greater than or equal to 5%.

<<Stranding Step>>

The copper alloy stranded wire of the present invention can be produced by stranding more than one copper alloy wires of the present invention. The copper alloy stranded wire may be compressed into a compressed wire material. When forming a stranded wire structure in which more than one wires are stranded, it is preferable to apply the above-mentioned heat treatment step to the stranded wire because the treatment makes the stranding of the stranded wire less prone to be released. Specifically, more than one wiredrawn materials having been wiredrawn to the final wire diameter in the wiredrawing step are stranded to form a stranded wire, and then the above-mentioned heat treatment is applied to the stranded wire. More than one copper alloy wires having been subjected to the heat treatment may be stranded, and after the stranding, heat treatment may further be applied.

<<Covering Step>>

The covered electric wire of the present invention can be produced by forming the above-mentioned insulation covering layer made of an insulating material on an outer circumference of the above-mentioned copper alloy wire of the present invention or copper alloy stranded wire of the present invention. Examples of a method for forming the insulation covering layer include extrusion covering and covering by powder coating.

<<Step of Attaching Terminal>>

The terminal-fitted electric wire of the present invention can be produced by attaching a terminal section to an end portion of the above-mentioned covered electric wire of the present invention and then, typically, bundling more than one terminal-fitted covered electric wires. The conductor may be attached to the terminal section by stripping a part of the insulation covering layer of the covered electric wire to expose the conductor, followed by crimping.

Test Example

A copper alloy wire was produced and then mechanical characteristics of the copper alloy wire were examined.

The copper alloy wire was produced in the following procedures. Electrolytic copper having a purity of 99.99% or more and a base alloy containing additive elements were prepared. They were placed in a high-purity carbon crucible and then vacuum-melted in a continuous casting apparatus, thereby preparing a mixed molten metal having the composition shown in Table 1. Using the resulting mixed molten metal and a high-purity carbon mold, a cast material having a circle shape in cross section and having a wire diameter of 16 mm was prepared by continuous casting. The resulting cast material was swaged to have a wire diameter of 12 mm (processing temperature: room temperature, degree of processing: 25%) and then subjected to a solution treatment at 950° C. for 1 hour, thereby preparing a solid solution wire material. Then, the solid solution wire material was subjected to wiredrawing to a wire diameter of 0.16 mm and the heat treatment (annealing) shown in Table 2 was performed.

TABLE 1

| Sample No. | Cu | Fe | Ti | Mg | Sn | Ag | Sr | Ni | In | Zn | Al | P | Fe/Ti (mass ratio) |
|---|---|---|---|---|---|---|---|---|---|---|---|---|---|
| 1 | Bal. | 0.70 | 0.28 | 0.06 | — | — | — | — | — | — | — | — | 2.5 |
| 2 | Bal. | 0.71 | 0.26 | 0.02 | — | — | — | — | — | — | — | — | 2.7 |
| 3 | Bal. | 0.71 | 0.14 | 0.13 | — | — | — | — | — | — | — | — | 5.1 |
| 4 | Bal. | 0.51 | 0.11 | 0.13 | — | — | — | — | — | — | — | — | 4.6 |
| 5 | Bal. | 0.71 | 0.26 | — | 0.10 | — | — | — | — | — | — | — | 2.7 |
| 6 | Bal. | 0.71 | 0.30 | — | — | 0.02 | 0.01 | 0.01 | — | — | — | — | 2.4 |
| 7 | Bal. | 0.71 | 0.30 | — | — | — | — | — | 0.02 | 0.01 | 0.01 | 0.005 | 2.4 |
| 8 | Bal. | 1.00 | 0.33 | 0.044 | — | — | — | — | — | — | — | — | 3.0 |
| 9 | Bal. | 1.00 | 0.20 | 0.13 | — | — | — | — | — | — | — | — | 5.0 |
| 10 | Bal. | 0.50 | 0.44 | 0.14 | — | — | — | — | — | — | — | — | 1.1 |
| 11 | Bal. | 0.51 | 0.44 | 0.051 | — | — | — | — | — | — | — | — | 1.2 |
| 12 | Bal. | 0.91 | 0.33 | 0.01 | — | — | — | — | — | — | — | — | 2.8 |
| 13 | Bal. | 0.90 | 0.30 | — | — | — | — | — | — | — | — | — | 3.0 |
| 14 | Bal. | 1.10 | 0.18 | 0.05 | — | — | — | — | — | — | — | — | 6.1 |
| 101 | Bal. | 0.76 | — | 0.05 | — | — | — | — | — | — | — | — | — |
| 102 | Bal. | 1.60 | 0.50 | 0.06 | — | — | — | — | — | — | — | — | 3.2 |
| 103 | Bal. | 0.30 | 0.12 | 0.03 | — | — | — | — | — | — | — | — | 2.5 |
| 104 | Bal. | 0.70 | 1.10 | 0.03 | — | — | — | — | — | — | — | — | 0.6 |
| 105 | Bal. | 0.50 | 0.08 | 0.06 | — | — | — | — | — | — | — | — | 6.3 |
| 106 | Bal. | — | — | — | 0.30 | — | — | — | — | — | — | — | — |

For the copper alloy wire obtained, tensile strength (MPa), conductivity (% IACS), and elongation (elongation at break (%)) were examined. The tensile strength (MPa) and the elongation (%, elongation at break) were measured by using a general tensile testing machine in accordance with JIS Z 2241 (Tensile testing method for metallic materials, 1998). The conductivity (% IACS) was measured according to the bridge method. The results are shown in Table 2.

TABLE 2

| Sample No. | Heat treatment | Tensile strength (MPa) | Conductivity (% IACS) | Elongation (%) |
|---|---|---|---|---|
| 1-1 | Before heat treatment | 752 | 17 | 2 |
| 1-2 | 450° C. × 8 h | 520 | 76 | 10 |
| 2 | 450° C. × 8 h | 507 | 65 | 10 |
| 3 | 450° C. × 8 h | 556 | 65 | 8 |
| 4 | 450° C. × 8 h | 510 | 67 | 5 |
| 5 | 450° C. × 8 h | 510 | 64 | 10 |
| 6 | 450° C. × 8 h | 505 | 65 | 10 |
| 7 | 450° C. × 8 h | 510 | 62 | 10 |
| 8-1 | Before heat treatment | 826 | 18 | 2 |
| 8-2 | 450° C. × 8 h | 561 | 74 | 8 |
| 9-1 | Before heat treatment | 855 | 17 | 2 |
| 9-2 | 450° C. × 8 h | 546 | 65 | 9 |
| 10-1 | Before heat treatment | 912 | 15 | 2 |
| 10-2 | 500° C. × 8 h | 597 | 66 | 9 |
| 11-1 | Before heat treatment | 869 | 15 | 2 |
| 11-2 | 500° C. × 8 h | 556 | 73 | 6 |
| 12 | 500° C. × 8 h | 498 | 72 | 10 |
| 13 | 450° C. × 8 h | 452 | 68 | 12 |
| 14 | 500° C. × 8 h | 500 | 60 | 8 |
| 101-1 | Before heat treatment | 663 | 21 | 2 |
| 101-2 | 450° C. × 8 h | 300 | 66 | 19 |
| 102 | Not processable | | | |
| 103 | 450° C. × 8 h | 370 | 85 | 15 |
| 104 | Not processable | | | |
| 105 | 450° C. × 8 h | 380 | 82 | 12 |
| 106-1 | Before heat treatment | 792 | 77 | 1 |
| 106-2 | 450° C. × 8 h | 250 | 83 | 16 |

As shown in Tables 1 and 2, Sample Nos. 1-2, 2 to 7, 8-2, 9-2, 10-2, 11-2, and 12 to 14, each of which was made of a copper alloy having a specific composition and had been subjected to a specific heat treatment (annealing) after wiredrawing, have a tensile strength greater than or equal to 450 MPa, a conductivity greater than or equal to 60% IACS, and an elongation greater than or equal to 5%, that is, they are high in strength and conductivity and also are superior in elongation. For Sample Nos. 1 and 8 to 11 given in Table 1, when comparing before and after the heat treatment as shown in Table 2, tensile strength is lowered by performing a specific heat treatment (annealing) as compared with before the heat treatment, but elongation is enhanced. Even if tensile strength is lowered, they have strength enough to be capable of being used suitably for a conductor material of an electric wire required to have impact resistance and flexural characteristics. That is, since the copper alloys have specific compositions, the samples can maintain a high strength and are superior in elongation while having a high strength and a high conductivity even if heat treatment is applied.

It should be noted that the present invention is not limited to the embodiments described above, and appropriate modifications may be performed without departing from the scope of the gist of the present invention. For example, the composition of the copper alloy, the wire diameter of the copper alloy wire, the solution treatment conditions, the heat treatment conditions, and so on may be modified within specific ranges.

INDUSTRIAL APPLICABILITY

The copper alloy wire of the present invention and the copper alloy stranded wire of the present invention can be suitably applied to the usage requiring weight reduction, high strength and high conductivity and superior impact resistance and flexural characteristics, such as an electric wire conductor in a routing structure of various electric devices including transportation devices such as an automobile and an airplane, and a control device such as an industrial robot. The covered electric wire of the present invention and the terminal-fitted electric wire of the present invention can be suitably used in electrical devices of various fields requiring weight reduction, and particularly in a routing structure of an automobile requiring weight reduction so as to improve the fuel efficiency.

The invention claimed is:

1. A copper alloy wire used as a conductor, the copper alloy wire consisting of:
   Fe in an amount greater than or equal to 0.4% by mass and less than or equal to 1.5% by mass;
   Ti in an amount greater than or equal to 0.1% by mass and less than or equal to 1.0% by mass;
   Mg in an amount greater than 0.03% by mass and less than 0.09% by mass; and
   the remainder being Cu and an impurity,
   wherein a wire diameter is less than 0.3 mm and Fe/Ti (mass ratio) is greater than or equal to 2.7 and less than or equal to 5.5.

* * * * *